United States Patent
Fontenot et al.

(10) Patent No.: US 9,934,270 B2
(45) Date of Patent: *Apr. 3, 2018

(54) SOURCE CODE SEARCH ENGINE

(71) Applicant: International Business Machines Corporation, Armonk, NY (US)

(72) Inventors: Nathan Fontenot, Georgetown, TX (US); Fionnuala G. Gunter, Austin, TX (US); Michael T. Strosaker, Austin, TX (US); George C. Wilson, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/682,269

(22) Filed: Aug. 21, 2017

(65) Prior Publication Data

US 2017/0344604 A1  Nov. 30, 2017

Related U.S. Application Data

(63) Continuation of application No. 15/342,183, filed on Nov. 3, 2016, which is a continuation of application No. 14/735,419, filed on Jun. 10, 2015.

(51) Int. Cl.
*G06F 17/30* (2006.01)
*G06F 9/44* (2018.01)
*G06F 11/36* (2006.01)

(52) U.S. Cl.
CPC ......... *G06F 17/30424* (2013.01); *G06F 8/31* (2013.01); *G06F 11/3668* (2013.01); *G06F 17/30637* (2013.01); *G06F 17/30657* (2013.01); *G06F 8/77* (2013.01)

(58) Field of Classification Search
CPC .......... G06F 8/31; G06F 8/77; G06F 11/3668; G06F 17/30637; G06F 17/30657; G06F 17/30424

See application file for complete search history.

(56) References Cited

U.S. PATENT DOCUMENTS

| 8,429,628 | B2 | 4/2013 | Spurlin |
| 9,378,242 | B1 | 6/2016 | Fontenot et al. |
| 9,516,051 | B1 * | 12/2016 | Hu .................... G06F 17/30424 |
| 9,720,925 | B1 | 8/2017 | Lawson |
| 9,723,016 | B2 * | 8/2017 | Hu .................... G06F 17/30424 |
| 2006/0004528 | A1 | 1/2006 | Uehara et al. |
| 2007/0299825 | A1 | 12/2007 | Rush et al. |

(Continued)

OTHER PUBLICATIONS

Hyun-Je Song et al., Computation of Program Source Code Similarity by Composition of Parse Tree and Call Graph, Mathematical Problems in Engineering, vol. 2015, retrieved online on Oct. 3, 2017, pp. 12. Retrieved from the Internet: <URL: https://www.hindawi.com/journals/mpe/2015/429807/>.*

(Continued)

*Primary Examiner* — Hanh T Bui
(74) *Attorney, Agent, or Firm* — Stosch Sabo

(57) ABSTRACT

A source code search comprises a two-pass search. The first pass comprises a topological measure of similarity. The second pass comprises a semantic measure of similarity. The query source code is a user-selected portion of source code. The results may be ranked and output to an I/O device.

1 Claim, 2 Drawing Sheets

(56) References Cited

U.S. PATENT DOCUMENTS

| | | | | |
|---|---|---|---|---|
| 2010/0083240 | A1* | 4/2010 | Siman | G06F 17/30424 717/144 |
| 2015/0046492 | A1 | 2/2015 | Balachandran | |
| 2016/0335281 | A1* | 11/2016 | Teodorescu | G06F 8/30 |
| 2016/0337388 | A1* | 11/2016 | Hu | G06F 17/30424 |
| 2016/0364473 | A1 | 12/2016 | Fontenot et al. | |
| 2017/0046250 | A1 | 2/2017 | Fontenot et al. | |

OTHER PUBLICATIONS

Seongsoo Park et al., Detecting Source Code Similarity Using Code Abstraction, ACM, 2013, retrieved online on Oct. 3, 2017, pp. 1-9. Retrieved from the Internet<URL: http://delivery.acm.org/10.1145/2450000/2448630/a74-park.pdf?>.*

Chuan, "Semantic grep", RCTay's Blog, Jun. 20, 2014. 22:51:44. http://rctay.tuletech.com/2014/06/semantic-grep Last printed Apr. 8, 2015. 4 pages.

Hsiao, "Software Plagiarism Detection Using Abstract Syntax Tree and Graph-Based Data Mining", Master's Thesis, 2002, Oklahoma State University. http://digital.library.okstate.edu/etd/umi-okstate-1249.pdf 53 pages.

Komondoor, et al., "Using Slicing to Identify Duplication in Source Code", '01 Proceedings of the 8th International Symposium of Static Analysis (SAS). Springer-Verlag London, UK, 2001. 18 pages.

Kontogiannis, et al., "Pattern Matching for Clone and Concept Detection", Automated Software Engineering, 1996. Copyright 1996 Kluwer Academic Publishers, Boston, MA. 32 pages.

Bonelli, "Cgrep: a context-aware grep for source codes", Cgrep by awgn. http://awgn.github.io/cgrep/ Last printed Apr. 8, 2015. 2 pages.

Kuhn, et al., "Abstract Syntax Tree", Eclipse Corner Article, Nov. 20, 2006. http://www.eclipse.org/articles/article.php?file=Article-JavaCodeManipulation_AST/index.html Last printed Apr. 8, 2015. 15 pages.

Li, et al., "The Source Code Plagiarism Detection using AST", 2010 International Symposium on Intelligence Information Processing and Trusted Computing. 3 pages. © 2010 IEEE DOI 10.1109/IPTC.2010.90

Ligaarden, "Detection of Plagiarism in Computer Programming Using Abstract Syntax Trees", Abstract of Master's Thesis, University of Oslo, Norway. Nov. 9, 2007. https://www.duo.uio.no/handle/10852/9811 Last printed Apr. 8, 2015. 3 pages.

Pawlik, et al., "Tree Edit Distance", http://www.inf.unibz.it/dis/projects/tree-edit-distance/ © 2012 Mateusz Pawlik and Nikolaus Augsten Last printed Apr. 8, 2015. 1 page.

Pewny, et al., "Leveraging Semantic Signatures for Bug Search in Binary Programs", ACSAC Dec. 8-12, 2014, New Orleans, LA, USA. DOI: 10.1145/2664243.2664269. 10 pages.

Shamir, et al., "Faster Subtree Isomorphism", Tel-Aviv University Department of Computer Science. Mar. 1998, Revised May 1999. 22 pages.

Tao, et al., "Improved Plagiarism Detection Algorithm Based on Abstract Syntax Tree", 2013 Fourth International Conference on Emerging Intelligent Data and Web Technologies. 6 pages. © 2013 IEEE DOI 10.1109/EIDWT.2013.129.

Toomey, "Code Similarity Comparison of Multiple Source Trees", School of IT, Bond University. Apr. 23, 2008. 12 pages.

Unknown, "Source Code Fragments Similarities Detection Using Abstract Syntax Trees", Slovak University of Technology. http://perconik.fiit.stuba.sk/Methods/KnowledgeAcquisition/FragmentSimilarityAST.aspx Last printed Apr. 8, 2015. 1 page.

Unknown, "Simian-Similarity Analyser", http://www.harukizaemon.com/simian/ Copyright 2003-2013 Simon Harris Last printed Apr. 8, 2015. 2 pages.

Unknown, "AST-based Search for Eclipse", http://stackoverflow.com/questions/2202921/ast-based-search-for-eclipse. Edited Feb. 4, 2010. Last printed Apr. 8, 2015. 2 pages.

Unknown, "How to Detect Code Duplication During Development", http://stackoverflow.com/questions/191614/how-to-detect-code-duplication-during-development Last printed Apr. 8, 2015. 4 pages.

Unknown, "What Tool to Find Code Duplicates in C# Projects?" http://web.archive.org/web/20140113162419/http://stackoverflow.com/questions/204177/what-tool-to-find-code-duplicates-in-c-sharp-projects Last printed Apr. 8, 2015. 4 pages.

Zhang, et al., "AST-based Multi-Language Plagiarism Detection Method", 2013 4th IEEE International Conference on Software Engineering and Service Science (ICSESS). 5 pages.

List of IBM Patents or Patent Applications Treated as Related, Aug. 21, 2017. 2 pages.

* cited by examiner

SOURCE CODE SEARCH ENGINE

BACKGROUND

The present disclosure relates to programming source code data, and more specifically, to locating similar source code data in a predetermined programming language.

Computer programmers often use Integrated Development Environments (IDEs) to generate, organize, and refine source code in a given programming language. IDEs are becoming more sophisticated to increase efficiency, quality, and productivity during software development.

SUMMARY

A computer-implemented method of, and a system and computer program product for identifying similar source code components is disclosed. According to some embodiments, the method, system, and computer program product includes creating structural representations of each user-defined query source code data set and each target source code data set. Candidate portions of the target source code may be identified by a topological similarity value. The candidate portions of target source code may be compared to the query source code by a semantic similarity value. The results of the source code search may be output in the form of a list.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
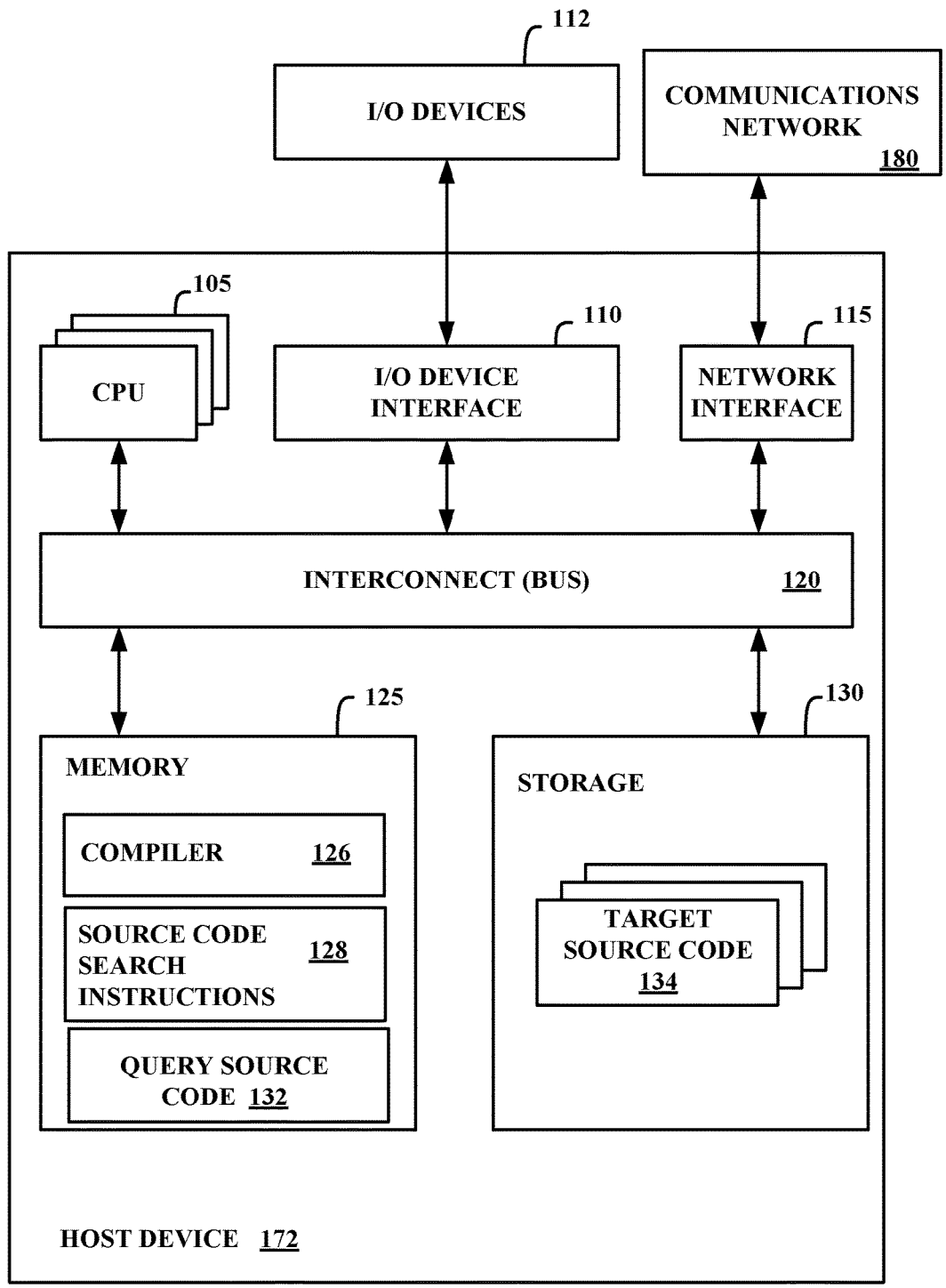
FIG. 1 depicts a block diagram of an example source code search system in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to finding similar source code components, more particular aspects relate to using a two-pass search to produce a list of similar source code components. While the present disclosure is not necessarily limited to such applications, various aspects of the disclosure may be appreciated through a discussion of various examples using this context.

A programmer may use an Integrated Development Environment (IDE) during software development. An IDE includes, but is not limited to, a source code editor, build automation tools, and a debugger which are expressed on a user interface. The source code editor may be used to create source code in a given programming language.

During source code development, a user may wish to manually or automatically organize the source code to improve functionality. For example, source code may be manually or automatically refactored during development. As understood by one of skill in the art, refactoring can reduce source code complexity and improve source code readability, maintainability, and extensibility. Refactoring may, for example, rearrange source code components or rename source code variables. In cases where refactoring is conducted automatically, the refactoring may alter the location, quantity, and variables associated with various components of the source code. As a result, a user may wish to find various components of the source code which have been changed as a result of refactoring. However, the continuous modification of source code data during development and the large amount of source code data generated during development can make locating components of the source code difficult.

Aspects of the present disclosure can provide the ability to locate a given source code component within rearranged source code, the ability to locate source code components similar, though not necessarily identical, to a given source code component, and the ability to confirm deletion of a given source code component from a repository of source code data. Furthermore, the present disclosure provides user-controlled granularity of the search results. The aforementioned advantages occur in some embodiments of the present disclosure, however, embodiments of the present disclosure are contemplated which may contain all or none of the previously listed advantages while staying within the spirit and scope of the present disclosure.

An aspect of the present disclosure provides a method to locate similar source code components using both topological and semantic measures of similarity. The combination of topological and semantic methods enables identification of rearranged source code components which may have structural, lexical, or structural and lexical differences when compared with the query source code prior to rearranging. More generally, the topological and semantic measures of similarity allow a user to find both identical matches and similar matches to a user-defined query source code.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present disclosure provides a computer-implemented method, system, and computer readable program for finding similar source code components using a two-pass search. According to an embodiment, the present disclosure describes a two-pass search in which the first pass identifies candidate portions of the target source code data set based on a topological method, and the second pass provides a similarity score for each candidate portion of the target source code data set based on a semantic method. Aspects of the present disclosure allow for a search with a controllable level of granularity based on the available time and necessary detail as required by the user. Accordingly, an understanding of embodiments of the present disclosure may be aided by describing embodiments of source code search systems and the environments in which these systems may operate.

Referring now to FIG. 1, shown is a block diagram of a source code search system in accordance with embodiments of the present disclosure. The source code search application is fully or partially embodied on host device 172. The host device 172 may include, without limitation, one or more processors (CPUs) 105, a network interface 115, an interconnect 120, a memory 125, and a storage 130. The host device 172 may also include an I/O device interface 110 connecting I/O devices 112 (e.g., keyboard, display, and mouse devices) to the host device 172. The I/O devices 112 are capable of receiving a user-defined input and are capable of outputting the results of a source code search.

Each CPU 105 retrieves and executes programming instructions stored in the memory 125 or storage 130. Similarly, each CPU 105 stores and retrieves application data residing in the memory 125 or storage 130. The interconnect 120 is used to move data, such as programming instructions and application data, between the CPU 105, I/O device interface 110, storage unit 130, network interface 115, and memory 125. The interconnect 120 can be implemented using one or more busses. The CPUs 105 can be a single CPU, multiple CPUs, or a single CPU having multiple processing cores in various embodiments. In some embodiments, a processor 105 can be a DSP. Memory 125 is generally included to be representative of a random access memory, e.g., SRAM, DRAM, or Flash. The storage 130 is generally included to be representative of a non-volatile memory, such as a hard disk drive, solid state device (SSD), removable memory cards, optical storage, or Flash memory devices. In an alternative embodiment, the storage 130 can be replaced by storage area-network (SAN) devices, the cloud, or other devices connected to the host device 172 via the communication network 180 or the I/O devices 112.

The network 180 may be implemented by any number of any suitable communications media (e.g., wide area network (WAN), local area network (LAN), Internet, Intranet). The network 180 may be implemented within a cloud computing environment, or using one or more cloud computing services. Consistent with various embodiments, a cloud computing environment may include a network-based, distributed data processing system that provides one or more cloud computing services. Further, a cloud computing environment may include any number of computers disposed within one or more data centers and configured to share resources over the network 180.

In some embodiments, the memory 125 stores a compiler 126, source code search instructions 128, and query source code 132. The storage 130 stores one or more target source codes 134. Alternatively, the source codes 132 and 134, the compiler 126, and the instructions 128 may be stored partially in memory 125 and partially in storage 130, or they may be stored entirely in memory 125 or entirely in storage 130, or they may be accessed over the network 180.

In various embodiments of the present disclosure, a user defines the query source code 132 using the I/O devices 112. For example, in some embodiments, a user highlights a portion of programming code to be defined as the query source code. The user also identifies the one or more target source codes 134 by selecting programming source code or by selecting a file path to one or more target source code files. Alternatively, the target source code 134 can be automatically selected. For example, in cases where the target source code is consistently stored in a known repository, the user would not need to identify the same repository prior to each search.

Following the selection of query source code and target source code, the compiler 126, executed by one or more CPUs 105, generates a structural representation of each query source code 132 and target source code 134. In some embodiments, several target source codes 134 are selected (e.g., multiple files of target source code). In cases where several target source codes 134 are selected, the compiler 126 generates a structural representation of each target source code 134. As understood by one skilled in the art, a compiler 126 generates a structural representation of a source code data set. According to an embodiment of the present disclosure, the compiler 126 generates a syntax tree representation of a source code data set consisting of nodes and relationships between nodes.

As is understood by one skilled in the art, multiple syntax tree structures exist such as concrete syntax trees (CST) and abstract syntax trees (AST). A CST, also known as a parse tree, includes all data from the source code. In contrast, an AST contains less information than a CST. As an example, a hypothetical AST could include operators and operands, but not include grouping parentheses. In contrast, a hypothetical CST generated from the same source code includes the operators, operands, and the grouping parentheses. As a result, the hypothetical AST can be generated faster than the hypothetical CST for an identical source code, given the smaller amount of information contained in the hypothetical AST.

The embodiments described herein can implement various methods to compare source codes. For example, lexical, topological, and/or semantic methods can be used. For the purposes of the present disclosure, given a concrete syntax tree, topological comparison methods consider the quantity of nodes, the associations between nodes, and the number of associations. Lexical comparison methods consider the contents of the nodes. Semantic comparison methods consider the quantity of nodes, the associations between nodes, the number of associations, and the contents of the nodes.

The source code search instructions 128 contain a first set of instructions which use the structural representation (e.g., a syntax tree) to identify candidate portions of the target source code 134 having a degree of similarity to the query source code 132 below a first threshold. In an embodiment of the present disclosure, the source code search instructions 128 comprise a modified subtree isomorphism method.

As is understood by one skilled in the art, subtree isomorphism refers to one or more topological methods used to determine if a given structural representation (e.g., query tree) exists as a portion of a larger structural representation (e.g., host tree). As an example, subtree isomorphism can be used to determine if a given syntax tree exists as a portion of a second syntax tree. Subtree isomorphism does not account for the lexical components within the nodes of two or more syntax trees, rather, subtree isomorphism relies on the number of nodes (e.g., vertices) and the associations between nodes (e.g., edges) to identify subtrees in a given host tree which are similar to a given query tree. In some embodiments of the present disclosure, the modified subtree isomorphism technique uses bipartite graphs or defines root vertices to assist in the identification of similar source code components.

According to an embodiment of the present disclosure, the modified subtree isomorphism method allows for similar matches between a query tree and a target tree. Specifically, the modified subtree isomorphism method allows for identification of partial matches in addition to identification of full matches based on the topology of the given syntax trees. The identification of partial matches is defined by a first threshold value, wherein the first threshold value is associated with the allowable number of differences in vertices, edges, or vertices and edges between two given trees under comparison. Each portion of the target source code 134 which partially or fully matches the topology of the query source code 132 based on the first threshold value is identified as a candidate portion of target source code 134.

In addition to causing the CPU 105 to perform a topological comparison, the source code search instructions 128 are further configured to cause the CPU 105 to perform a semantic comparison between each candidate portion of target source code 134 and the query source code 132.

In some embodiments of the present disclosure, the source code search instructions 128 cause the CPU 105 to calculate the degree of semantic similarity between two syntax trees by using a tree edit distance. As understood by one skilled in the art, a tree edit distance is calculated by determining the minimal-cost sequence of node edit operations (e.g., insert, delete, and rename operations) to transform one syntax tree to a second syntax tree. Each type of operation is associated with a cost. The total cost of a given set of operations is the type of operation multiplied by the number of times said operation is used, summed for each type of operation required to complete the transformation. Where multiple sets of operations exist to transform one syntax tree to a second syntax tree, the set of operations having the lowest total cost is considered the tree edit distance. The node edit operations account for the semantic (i.e. both topological and lexical) similarities and differences of the syntax trees under comparison.

The source code search instructions 128 cause the CPU 105 to determine the semantic similarity between the query source code 132 and the candidate portions of the target source code 134. The candidate portions of the target source code 134 which meet a second similarity criteria, such as a second threshold, are then selected for display to a user, as described in more detail below with respect to FIG. 2.

Thus, following completion of the source code search instructions 128, the results of the source code search are stored partially or entirely in the memory 125, storage 130, or on a network 180. According to an embodiment of the present disclosure, the results are output in the form of a list to one or more I/O Devices 112.

Figure 2:
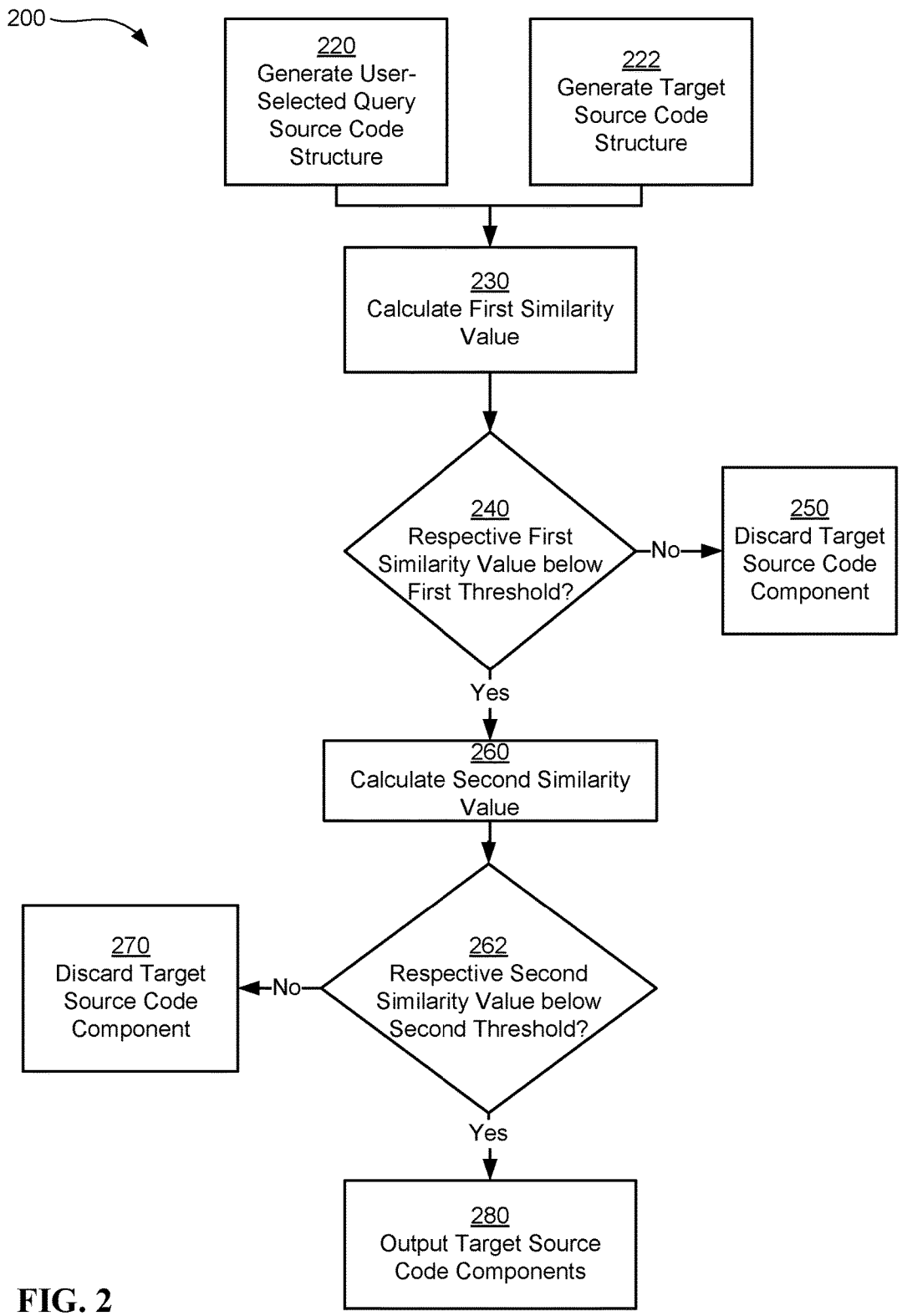
FIG. 2 illustrates a flowchart of an example method to identify similar source code components in accordance with embodiments of the present disclosure.

Referring now to FIG. 2, shown is a flowchart of an example method 200 for locating similar source code components in accordance with embodiments of the present disclosure. The method 200 can be implemented by a processing unit executing corresponding instructions, such as CPU 105 executing the source code search instructions 128 discussed above. Thus, in some embodiments, one or more operations of the method 200 are performed by the host device 172 of FIG. 1. The method 200 begins by generating structural representations of a user-selected query source code data set 220 and each discrete target source code data set 222. According to some embodiments, the user selected query source code and the target source code are the same or substantially similar to the query source code 132 and target source code 134 of FIG. 1. According to some embodiments, the operations 220 and 222 are executed by the compiler 126 of FIG. 1.

According to some embodiments of the present disclosure, the query source code is selected by a user by highlighting a portion of text in a given programming language. In the event the query source code data is insufficient to generate a query source code structural representation 220, then the user selected query source code will be automatically expanded to include adjacent portions of the source code data. For example, the automatic expansion of the query source code completes a source code function, such as closing a loop or completing a call, where a portion of a function is selected by a user. According to various embodiments of the present disclosure, the target source code is a user selected repository of at least one source code file, or the target source code is a user selected portion of source code text. In some additional embodiments, the target source code is an automatically selected file or set of files. In the event the target source code consists of multiple files, then operation 222 will create a source code structure for each discrete file. In embodiments where the user selects the query source code and the one or more target source codes, the user makes said selections using the I/O devices 112 of FIG. 1.

In some embodiments, the structural representation is a syntax tree. Once the source code structures have been created for the query source code and each discrete target source code, the query source code structure 220 is compared to each target source code structure 222 in operation 230. Operation 230 comprises a topological comparison which calculates a first similarity value. According to an embodiment of the present disclosure, the first similarity value of operation 230 is based on a modified subtree isomorphism technique. Specifically, the first similarity value 230 is the difference in number of vertices, edges, or vertices and edges between a portion of a target source code structure 222 and the query source code structure 220.

Per operation 240, each portion of target source code having a respective first similarity value 230 is compared to a first threshold. The first threshold is an automatic or user-defined numeric value or percentage. According to some embodiments of the present disclosure, where the first threshold is a numeric value, the numeric value represents the allowable number of differences in vertices, edges, or vertices and edges between the query source code syntax tree and the target source code syntax subtree. In some embodiments where the first threshold is a percentage, the percentage represents a percentage of the closest matches.

In the event that the degree of similarity between a given portion of a given target source code structure 222 and query source code structure 220 is insufficiently similar in light of the first threshold, that portion of the target source code structure 222 is discarded in operation 250. Alternatively, in the event that the degree of similarity for a given portion of a given target source code structure 222 and query source code structure 220 is sufficiently similar per the first threshold, then that portion of the target source code structure 222 is processed in operation 260.

As shown, aspects of target source code structures 222 which have an acceptable value compared to the first threshold may proceed to operation 260 to calculate a second similarity value with respect to the query source code structure 220. The second similarity value is a function of the semantic similarity between a portion of the target source code structure 222 with an acceptable first similarity value 230 per the first threshold and the query source code structure 220. According to an embodiment of the present disclosure, the similarity value is a tree edit distance.

As shown in operation 262, in the event the second similarity value is unacceptable compared to the second threshold, that aspect or portion of the target source code structure may be discarded in operation 270. In the event the similarity value 260 is acceptable with respect to the second threshold that aspect of the target source code may be output in operation 280.

The second threshold is a user-defined or automatically generated numeric value or percentage. According to some embodiments of the present disclosure, a numeric value represents the acceptable tree edit distance. According to an alternative embodiment, a percentage represents a percentage of the lowest tree edit values given the number and range of tree edit values generated in operation 260.

Operation 280 outputs the acceptable results per operation 262. Operation 280 results in zero, one, or more than one outputs based on the results of operation 240 and operation 262. According to an embodiment of the present disclosure, where more than one output is generated, the outputs are ranked from most to least similar as a function of the second similarity value 260. In an alternative embodiment, the ranking may be a function of a combination of the first similarity value 230 and the second similarity value 260.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:
a processor; and
a non-transitory computer readable storage medium for storing instructions which, when executed by the processor, perform a method comprising:
creating a respective abstract syntax tree (AST) of each of a user-defined query source code data set and at least one target source code data set, wherein the user-defined query source code data set comprises a selected portion of source code in a given programming language comprising a complete function, wherein the target source code data set comprises at least one file within at least one repository containing source code in the given programming language;
calculating a respective first similarity value for each of one or more portions of each of the at least one target source code data sets, wherein each respective first similarity value comprises a topological measure of similarity between the user-defined query source code data set and each respective portion of the at least one target source code data set, which comprises a respective target source code abstract syntax subtree, wherein calculating the respective first similarity value further comprises:
calculating, for the query source code abstract syntax tree, a first number of vertices and edges;
calculating, for each respective target source code abstract syntax subtree, a respective second number of vertices and edges;
calculating, for each respective target source code abstract syntax subtree, a respective absolute value of a difference between the first number and the respective second number; and
comparing, for each respective target source code abstract syntax subtree, the respective absolute value to a first threshold;
identifying portions of each of the at least one target source code data sets having the respective first similarity value less than or equal to the first threshold, wherein the first threshold comprises a permissible difference in the number of vertices, edges, or vertices and edges between the user-defined query source code abstract syntax tree and the respective target source code abstract syntax subtree;
calculating a respective second similarity value for each portion of the target source code data set having the respective first similarity value less than or equal to the first threshold, the respective second similarity value comprising a semantic measure of similarity between the user-defined query source code data set and each respective portion of the target source code data set having the respective first similarity value less than or equal to the first threshold, wherein calculating the respective second similarity value further comprises:
identifying one or more series of operations to transform the target source code abstract syntax subtree to the query source code abstract syntax tree, wherein said series of operations comprises one or more of insert, delete, and rename operations;
calculating, for each identified series of operations, a cost of the identified series of operations, wherein the cost of the identified series of operations is associated with one or more of insert, delete, and rename operations;
wherein the cost of the identified series of operations is the respective second similarity value; and
selecting the series of operations having a lowest cost;
outputting, to a user interface, each portion of each target source code data set having the second similarity value less than or equal to a second threshold, wherein each portion is ranked according to the second similarity value.

* * * * *